United States Patent [19]

Bontrager et al.

[11] 4,191,224
[45] Mar. 4, 1980

[54] APPARATUS FOR MAKING CELLULOSE INSULATION

[75] Inventors: Kenneth L. Bontrager, Jefferson County, Colo.; Marion R. Bontrager, Phoenix, Ariz.; Robert J. Taylor; David C. Card, both of Denver, Colo.

[73] Assignee: Diamond Insulation Industries, Inc., Denver, Colo.

[21] Appl. No.: 822,232

[22] Filed: Aug. 5, 1977

[51] Int. Cl.² .................... B05C 5/00; B05C 11/10
[52] U.S. Cl. ........................................ 141/100; 118/94; 118/712; 118/35; 118/303; 241/43
[58] Field of Search ................ 118/35, 6, 37, 9, 303, 118/10, 11; 427/212, 214; 241/41, 42, 43, 60; 302/64; 162/4; 141/164, 272, 100

[56] References Cited

U.S. PATENT DOCUMENTS

| | | | |
|---|---|---|---|
| 1,222,199 | 4/1917 | Gammel | 141/164 X |
| 2,147,793 | 2/1939 | Kropp | 427/214 X |
| 2,428,100 | 9/1947 | Soulen | 241/34 |
| 2,893,850 | 7/1959 | Bichowsky | 118/49.5 X |
| 3,259,104 | 7/1966 | Gerber | 118/35 X |
| 3,265,445 | 8/1966 | Cronin | 302/64 |
| 3,622,077 | 11/1971 | Wiegand | 239/336 |

*Primary Examiner*—John P. McIntosh
*Attorney, Agent, or Firm*—Sheridan, Ross, Fields & McIntosh

[57] ABSTRACT

A method and apparatus is provided for the two stage grinding of paper material with the controlled addition of dry and wet fire retardant chemicals to produce a desirable cellulose insulation material. The paper is first ground into coarse granules which are placed in a storage hopper and systematically fed by an auger into a fine grinder. At the same time that the cellulose material is introduced into the fine grinder, a controlled flow of dry fire retardant chemicals is continuously added and ground with the material. The resultant granular material is then transported by air in an upward direction where a solution of liquid fire retardant chemicals is sprayed in a concurrent direction with the flow so as to wet and saturate the cellulose material producing a fire retardant product. The wetted material, because of its adhering qualities, is directed through a corrugated flexible pipe section to storage. An arrangement is provided for extending and contracting portions of the flexible pipe to prevent the material from collecting and blocking the flow of material. A novel bagging apparatus is provided which allows the insulation material to be fed directly into a horizontal bag and automatically shutting off the flow when the bag is filled. The bag is then automatically lowered into a vertical position for removal. An electrical alarm system is provided in conjunction with a rotary "water wheel" type dry chemical flow meter and optical liquid flow meter, for controlling the operation to maintain the proper ratio of fire retardant chemicals to cellulose material to produce a quality insulation product.

7 Claims, 9 Drawing Figures

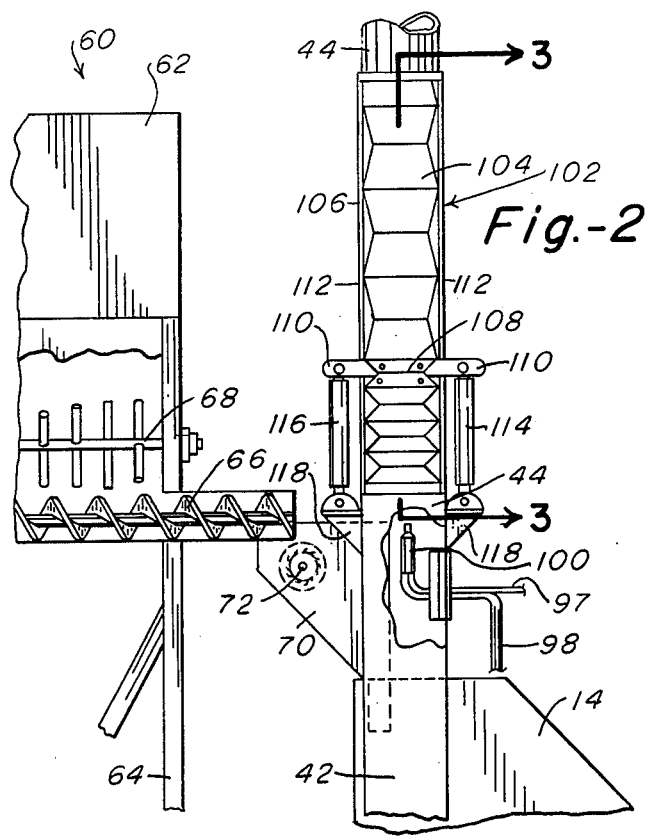
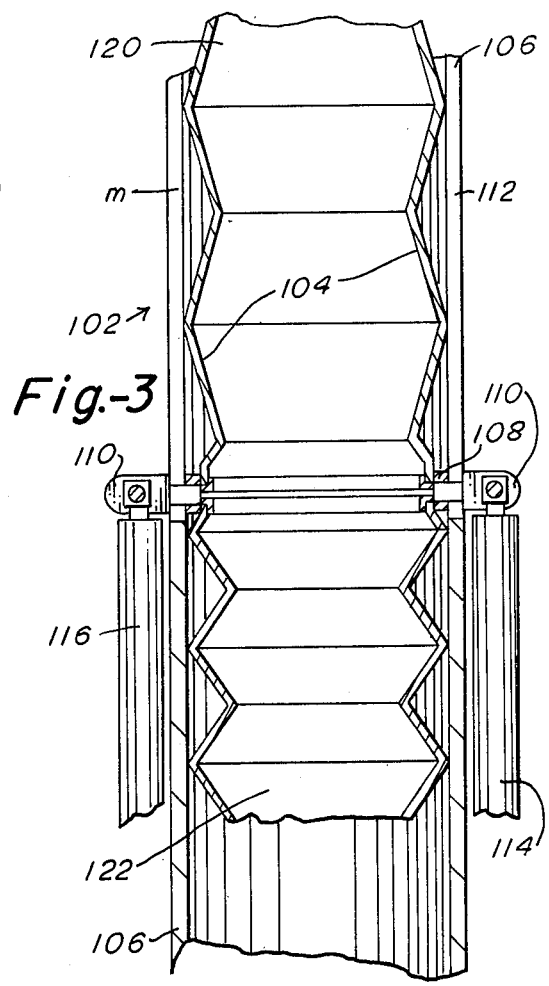
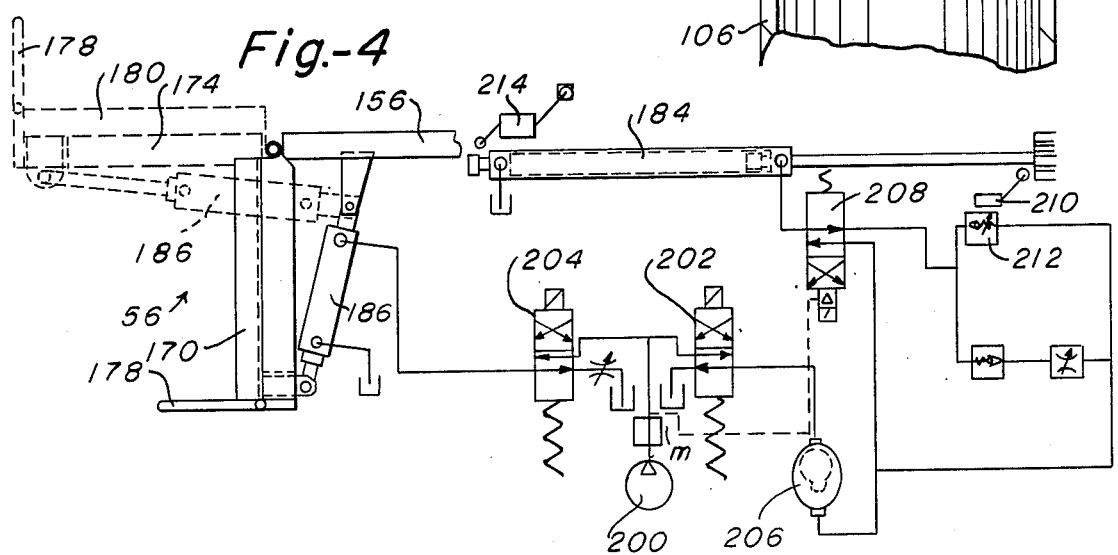

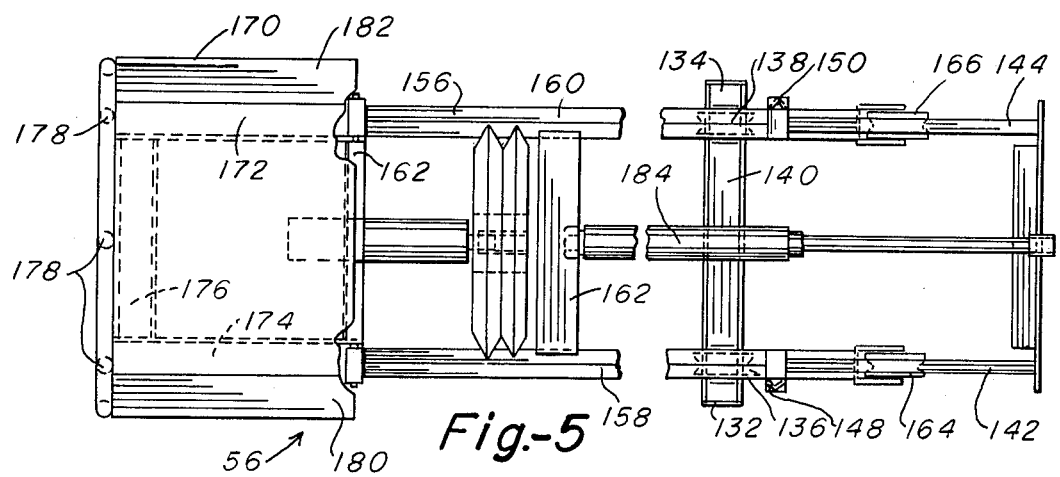
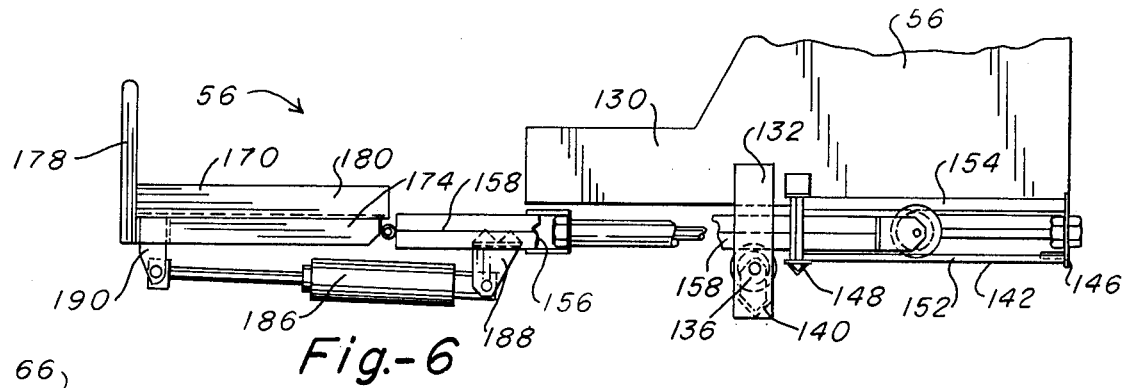
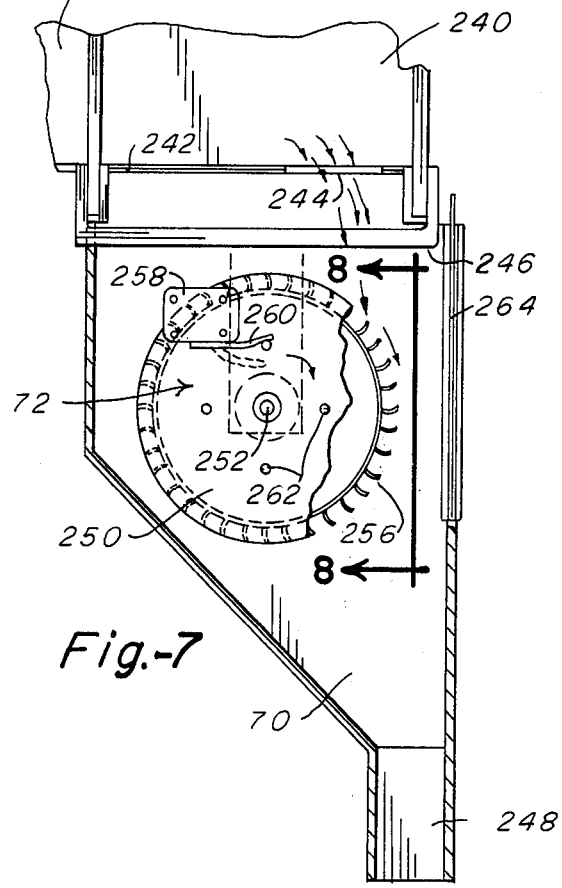
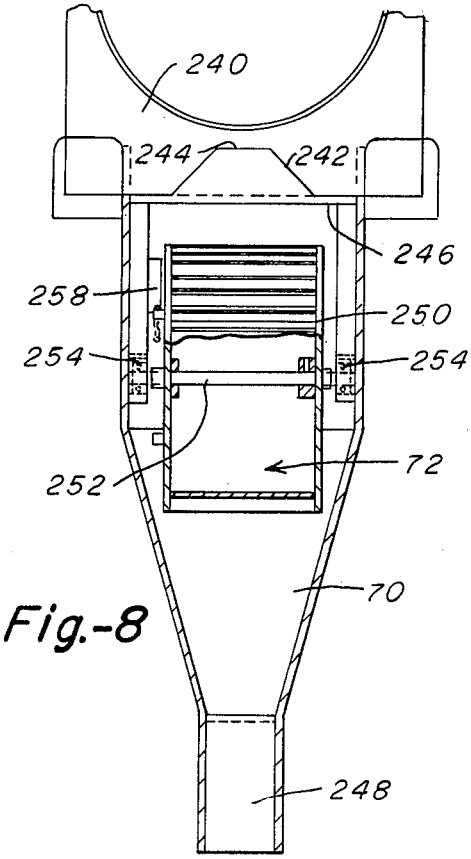

APPARATUS FOR MAKING CELLULOSE INSULATION

BACKGROUND OF THE INVENTION

1. Field of the Invention

This invention is directed to an apparatus for producing quality fire retardant cellulose insulation and is more particularly directed to a system and process for grinding and thoroughly mixing chemicals with the cellulose product to obtain a fire retardant, quality insulation material.

2. The Prior Art

The applicant hereby lists the most pertinent prior art of which he is aware:

U.S. Pat. No. 2,100,848;
U.S. Pat. No. 2,428,100;
U.S. Pat. No. 2,707,690;
U.S. Pat. No. 2,707,847;
U.S. Pat. No. 2,973,740;
U.S. Pat. No. 3,013,525;
U.S. Pat. No. 3,118,459;
U.S. Pat. No. 3,548,782;
U.S. Pat. No. 3,967,005.

The Soulen patent (U.S. Pat. No. 2,428,100) is directed to a single stage machine for making cellulose insulation material from waste paper and the addition of a chemical fire retardant substance to the material during the grinding process. The Anliker patent (U.S. Pat. No. 2,707,847) produces rockwool fiber insulation and uses a spray nozzle which sprays an additive in the direction of the fiber travel for thoroughly coating these fibers. The patent to Hardgrove (U.S. Pat. No. 2,100,848) shows a feeder control mechanism for controlling the amount of material introduced into a pulverizer so that the amount of material will not overload the capacity of the pulverizer. This patent also teaches the use of a cyclone or conical separator to separate fine or small particles from coarse material. The Cattaneo patent (U.S. Pat. No. 3,967,005) shows an auger type conveyor for moving a quantity of pellets and adding liquid and dry materials to the pellets for coating and mixing as seen in FIG. 4.

The patents to Fuller (U.S. Pat. No. 3,013,525), Hopkins (U.S. Pat. No. 2,973,740), Pearson (U.S. Pat. No. 2,707,690), Stumpf (U.S. Pat. No. 3,118,459), Bergquist (U.S. Pat. No. 3,548,782), and Wiegand (U.S. Pat. No. 3,622,077) show various arrangements for adding liquid materials by means of spray nozzles to a flow stream of primarily fibrous or light materials. The Fuller and Hopkins patents teach the use of a deflector in the center portion of the stream and the angular spraying of the liquid additive across the direction of flow of the materials. Stumpf shows the changing of the velocity of the materials and the spraying of the additive into an area of low velocity. Pearson, Bergquist, and Wiegand show various arrangements for spraying additives into the flow stream of materials. The Fuller patent (U.S. Pat. No. 2,808,580) is typical of the flow meter alarm systems which use light and photoelectric devices for detecting variations in flow quantity. FIG. 2 shows the use of the flow meter with an alarm system and/or control valves for controlling the amount of flow within the system.

In the past, it has been common practice to produce cellulose insulation by merely shredding or grinding ordinary paper stock, newspapers, or waste paper in various types of grinders of the hammer, ball, or shredding types. Because of the highly flammable character of the shredded paper material which produces the cellulose insulation, it is a mandatory requirement that some type of fire retarding qualities be added to the insulation. Usually during the shredding or grinding process, dry chemicals for fire proofing or retarding the insulation material are added. The addition of the dry chemicals directly into the grinder performs a reasonable mixing of the materials to provide the desired characteristics.

One of the major problems that have been found in the prior art systems is that the dry chemicals are ground and powdered along with the cellulose material which makes the chemicals subject to producing a dust-like condition which allows light air currents to easily disperse the chemicals and reduce the fire retardant character. In addition, major problems have been encountered in controlling the flow of dry chemicals to the grinders to maintain the proper ratio of relatively expensive chemicals to the paper cellulose materials. As can be expected, there is an optimum ratio of chemicals to insulation material to provide the optimum fire retarding results. In the past, there have been numerous unsuccessful attempts to mechanically control the quantity of chemicals being introduced into the grinder in direct relationship to the amount of paper being fed or delivered to the grinder.

Other processes have tried to spray a liquid chemical into the material, but this has been found to be relatively difficult in that uneven and inconsistent wetting of the materials results, producing a product which has varying degrees of fire retardant capabilities provided in the finished product. In addition, overwetting of the cellulose insulation material produces a gummy and sticky mass which is extremely difficult to transport and convey during the process. Thus, using the liquid spray technique causes enumerable difficulties in maintaining a continuous production with the necessity for frequent shut-down for the cleaning of pipes and conduits.

Another major problem that has been in constant occurrence in the insulation industry is the control and bagging of the insulation product to provide optimum packing and filling of the product containers and ease in handling the material. In many cases a sack or bag has been held over the bottom end of a chute with the material dropped by gravity through the opening until the bag appeared to be relatively full. Very little density control and materials consistency was possible with this type of arrangement.

In addition, various mechanical control systems, including hydraulic and pneumatic, have been proposed for insulation producing aparatus in the past. Various types of automatic electronic controls have also been suggested but it has been found that these systems are inadequate and unsatisfactory in providing a quality insulation material that is so vitally needed by the public in these times of short energy supply.

As mentioned above, the traditional method for fireproofing cellulose insulation material has been the dry method which involves the addition of certain dry granular chemicals to the paper stock as it enters the grinders. The dry, powder-like chemicals are thus mixed and ground with the paper material to form a fire-retardant insulation consisting of about 20% by weight of chemicals and 80% paper. A common criticism of this product is that it is very dusty, especially when it is blown into attics and other spaces to be insulated. Other criticism of this manufacturing process includes an uneven ratio of chemicals to paper and the possibility of settling out or separation of the chemicals from the paper at some later time. Thus, the most common criticisms or weaknesses in the prior art methods of manufacturing cellulose insulation have been the dusty nature of the final product, the possible separation of the dry fire retardant chemicals from the paper, and the unreliable method of mixing the correct ratios of chemicals and paper.

SUMMARY OF THE INVENTION

The apparatus for producing improved cellulose insulation materials according to the present invention incorporates a two-stage grinding process to thoroughly prepare and mix the materials used. Materials such as waste paper, newsprint, or any other paper material available are continuously fed into a coarse grinder or shredder device. This first stage ground material is then passed through a conical separator where the fine particles are removed and the coarse insulation material placed in a storage hopper. A rotating auger conveyor provided in the bottom of the storage hopper feeds and delivers the coarse insulation stock into the second or fine grinder. A rotating wire agitator provided in the storage hopper breaks and prevents bridging of the material above the auger and allows a continuous, even flow of material to the fine grinder.

At the same time that the coarse cellulose material is introduced into the fine grinder, a second rotating auger continuously feeds a stream of dry fire retardant chemicals into the grinder. Thus, the grinding process not only grinds the cellulose material to a fine granular consistency, but also mixes the dry chemicals with the material. A rotating "water-wheel" type rotary flow meter is provided in the discharge chute of the chemical feed device so that the rate of flow of the chemicals to the grinder is constantly monitored and controlled to provide the desired ratio of chemicals to insulation. The finely ground cellulose insulation and dry chemicals are then transported by a blower from the fine grinder to a second conical separator.

To improve the fire retardant qualities of the insulation and better mix and adhere these chemicals, a stream of air and liquid fire retardant chemicals are sprayed into a corrugated flexible pipe section arranged as the outlet of the blower. The liquid spray is directed concurrent with the flow of the insulation and wets and saturates the insulation material to thoroughly penetrate the fibrous material. The flexible pipe section is provided to prevent the dampened insulation from sticking and clogging the discharge pipe. A collar attached around the midpoint of the flexible section is connected to a pair of pneumatic power cylinders. The flexible section is periodically cycled in a longitudinal direction to extend one-half of the pipe while compressing the remaining half. Thus, the sections of the flexible pipe are longitudinally moved back and forth to expand and contract periodically to further aid in preventing the collection and clogging of the damp materials within the outlet pipe.

After removal of the extremely fine particles in the second separator, the finished insulation is stored in a bagging hopper where a rotating auger is provided for delivering the prepared insulation to waiting containers.

The bagging arrangement for the present invention includes a horizontal loading carriage which is positioned immediately below and aligned with the outlet discharge of a horizontal chute from the storage container. A bag or container is positioned over the chute and the bag is filled while lying horizontal. The continuous filling of the bag by the auger type conveyor forces the carriage to move outward against a variable restraint which packs the bag to a desired density and weight of insulation material. At this point, the filling stops and the carriage automatically lowers or pivots downward so that the bag is sitting in an upright position suspended a slight distance from the floor so that it can be easily removed by the operator for inspection and sealing.

Two very important areas are covered by the present invention in that the addition of the dry and liquid fire retardant chemicals and the mixing of these chemicals with the insulation material is performed in a continuous process to provide a highly desirable quality product. An electronic control system is provided fo monitoring and controlling the entire process to maintain the quality of the product. This control system utilizes flow meters in both the dry and liquid chemical stream with a signal from these devices fed directly to a comparison circuit which detects abnormally low flow rates in either one of the chemical streams. A reduction in the flow rate of either the dry or wet fire retardant chemicals will initiate an alarm system with the automatic shut down of the feed augers for both the chemicals and the cellulose insulation. Thus, a constant and desirable ratio of chemicals to insulation is maintained during operation.

Other objects and features of this invention will appear in the following description and appended claims, reference being made to the accompanying drawings forming a part of the specification, wherein like reference characters designate corresponding parts in the several views.

DESCRIPTION OF THE DRAWINGS

FIG. 2 is a partial side cross-sectional view of a portion of the apparatus wherein the liquid and dry fire retardant chemicals are added to the insulation flow stream, the flexible pipe section is shown downstream of the spray nozzle;

FIG. 3 is an enlarged side cross-sectional view taken along lines 3—3 of FIG. 2 showing the flexible pipe section with the midpoint collar attached to a pair of pneumatic cylinders for positioning the collar as desired;

FIG. 4 is a schematic view of the insulation bagging apparatus including the control system for automatic operation;

FIG. 5 is a top plan view of the bagging apparatus;

FIG. 6 is a side elevation view of the bagging apparatus showing the relative position of the actuating cylinders;

FIG. 7 is a side sectional view showing the waterwheel type flow meter provided in the dry chemical discharge chute;

FIG. 8 is a front sectional view of the rotometer shown in FIG. 7; and

DETAILED DESCRIPTION OF THE EMBODIMENTS

As is the case with all insulation materials which are fabricated from organic matter, it is a mandatory requirement that these materials be treated in order to reduce the fire hazard and the spread of fire within these materials. This is especially true of cellulose insulation in which paper is shredded and ground to form the insulation. As is common with most processes for manufacturing this type of insulation, fire retardant chemicals are mixed with the materials to produce the fire retardant or fireproofing characteristics required. In the present invention, a process and apparatus is described which produces a desirable granular insulation in which dry fire retardant chemicals are added and mixed with the insulation material and then the product is sprayed further with a liquid fire retardant material to saturate and evenly absorb the chemicals to produce a highly desirable fire retardant insulation.

Figure 1:
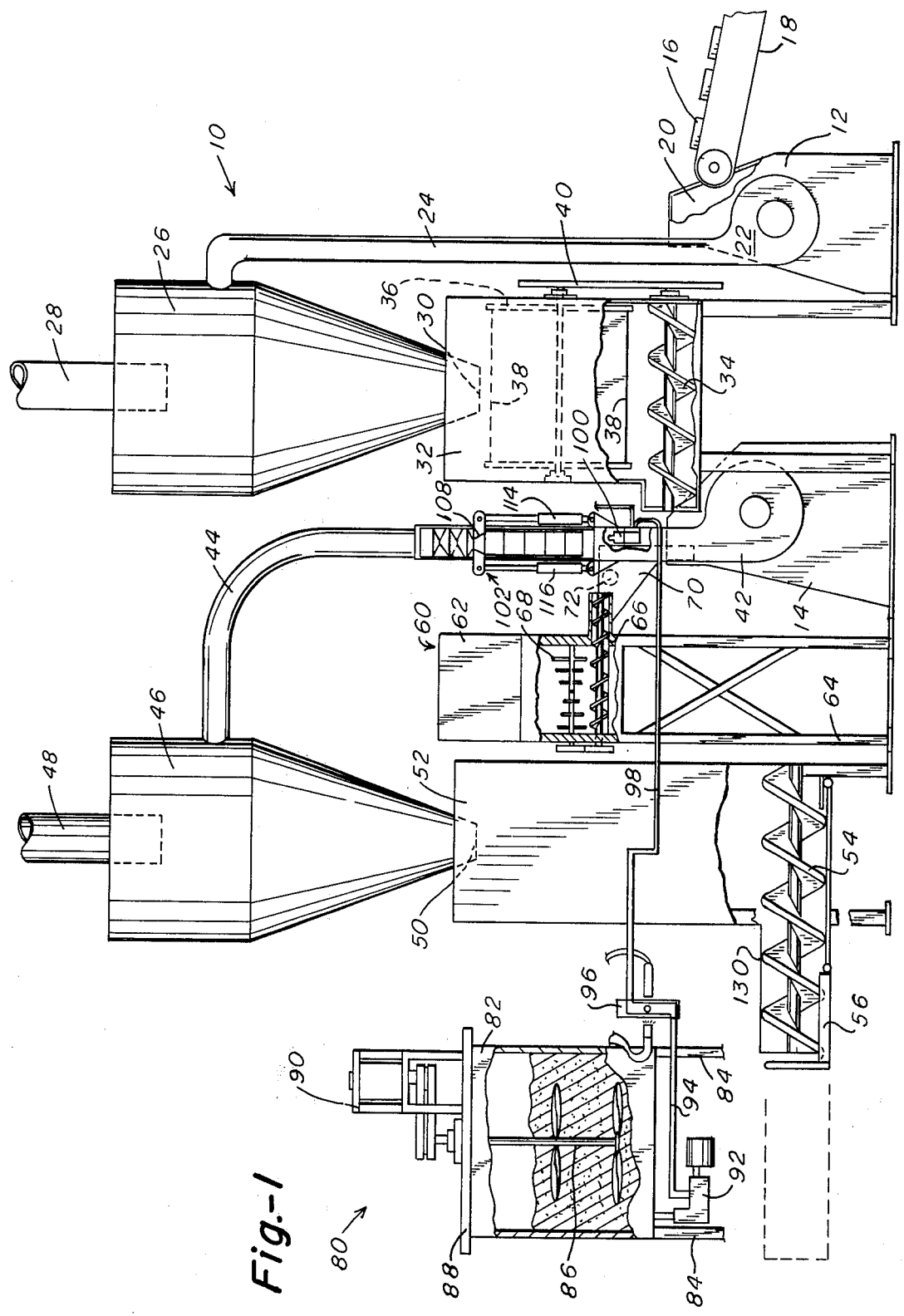
FIG. 1 is a pictorial view with portions cut away of the cellulose insulation manufacturing apparatus of the present invention; the flow of material through this system is from right to left as viewed in this figure.

As can be seen in FIG. 1, the insulation manufacturing apparatus 10 includes a coarse grinder or shredder 12 and a fine grinder or shredder 14. Thus, a two stage grinding and shredding operation is provided which reduces the incoming waste paper stock to the desired granular consistency which is found desirable with this type of insulation. The waste paper in the form of newsprint, paper sacks, bags, or any other type of waste paper 16 is fed into the primary grinder 12 by means of the belt conveyor 18. The continuous movement of the conveyor 18 deposits the paper material 16 in the open entrance 20 of the grinder 12.

The grinder 12 is intended to coarsely shred and tear apart the particles and fibers of the paper to a granular consistency which will pass through a one-inch screen. It is to be understood that any type of grinder or shredder such as a hammer or ball mill can be utilized in this process so long as the paper fibers are separated and ground into a granular consistency. The coarse and fine grinders can be of the same or different type so long as the desired product is obtainable.

A blower 22 provided in conjunction with the coarse grinder 12 carries the coarsely ground material upward through discharge pipe 24 into the side of the conical separator or cyclone 26. As is typical with this type of separator, the flow of the material is circumferential around the inside surface of the separator body providing a circular motion wherein the light unwanted fine particles are discharged through the outlet 28 with the granular insulation material falling by gravity through the discharge opening 30. From the discharge opening 30, the coarse insulation material is deposited in the storage hopper 32 in preparation for the second stage grinding. An auger type conveyor 34 driven by a power drive unit (not shown) is provided in the bottom portion of the storage hopper 32 for continuously delivering the coarsely ground insulation material into the important second stage grinder.

A rotatably mounted rotor assembly 36 is provided within the storage hopper 32. Tightly stretched wires 38 are positioned between the arms of the rotor 36 and are positioned to pass close to the discharge area of the hopper 32 where the insulation material feeds into the conveyor 34. In this way, the wires constantly stir and agitate the insulation material above the conveyor to prevent bridging and to allow continuous even feeding of the insulation material to the conveyor. In this way, an even discharge and flow from the conveyor 34 can be provided to the fine second stage grinder 14. The rotating carriage 36 is driven by a sprocket and a chain assembly 40 drivingly connected to the power drive for the conveyor 34.

It should be noted that the drive assembly for the conveyor 34 is completely separate and independent of the first stage grinder and supply conveyor 18. Thus, the flow rate of the insulation material from the auger 34 to the second stage grinder is independent of the flow rate of the material coming from the coarse grinder. This is important from the standpoint that the flow rate of the insulation materials to the second stage grinder must be known or controlled precisely in order to provide the required dry and wet chemical flow rates to provide the optimum ratios. Thus, the control of the flow rates of the insulation material to and from the secondary grinder and the introduction of the dry and wet fire retardant chemicals is of major importance.

A motor driven blower assembly 42 is connected to the discharge opening of the grinder 14 and propels the finely ground granular cellulose insulation upward through discharge pipe 44 to the conical separator 46. All undesirable light and extremely fine particles of the insulation are discharged outwardly through the exhaust 48 with the insulation material dropping through the discharge outlet 50 into the bagging storage hopper 52. A bag filling auger type conveyor 54 is provided in communication with the lower portion of the storage hopper 52 and includes a bagging assembly 56 which will be described in more detail. A separate independent motor drive assembly provides power for the bagging auger conveyor 54 to discharge the cellulose insulation material to the bagging assembly as required.

One of the most important areas in the entire manufacturing process as stated above is the introduction of the dry and wet fire retardant chemicals to the finely ground insulation material. This addition of the chemicals is performed at and after the second stage fine grinding operation. As the coarse insulation conveyor 34 is rotated, a steady discharge of insulation material is provided to the inlet of the second stage grinder which further grinds the material until it will pass through a 3/16-inch screen mesh. Positioned in conjunction with the entrance to the second stage grinder 14 is a dry chemical storage and dispensing system 60. The dry chemical dispensing system 60 includes a dry chemical storage hopper 62 mounted on support structure 64. At the bottom of the storage hopper 62 is an auger type conveyor 66 which has a smaller outside diameter than the insulation feed conveyors mentioned above. Immediately above the auger conveyor is a series of outwardly extending fingers mounted on a rotating shaft 68 for agitating the dry chemicals and providing an even feed of the chemical materials to the auger conveyor. The agitator or shaft 68 is driven by a pair of gears from the rotating shaft of the auger conveyor 66 which in turn is driven by a variable speed motor (not shown). The speed of the motor is controlled as desired to provide the desired ratio of dry fire retardant chemicals to the quantity of dry insulation being introduced to the second stage grinder. A guide chute 70 is positioned below the outlet of the auger conveyor 66 for guiding the flow of chemicals into the inlet of the fine grinder 14. A "water-wheel" type rotary flow meter 72 positioned within the chute 70 provides an output signal to the control system to indicate the flow of dry chemicals to the grinder.

A liquid fire retardant chemical dispensing system 80 is also provided in the present system. The liquid chemical system has a tank 82 supported on legs 84 with a mixing impeller 86 rotatably mounted in the cover 88. A motor drive assembly is suitably connected to the shaft of the impeller 86. A motor driven pump assembly 92 moves the liquid solution from the bottom of the tank through conduit 94, flow meter 96 and tube 98 to the spray nozzle 100 which is centrally positioned within a portion of the blower outlet pipe 44 approximately three to four feet downstream of the blower 42.

In order to obtain proper feeding of the fine granular insulation material, the outlet pipe 44 is positioned vertically so that the particles are carried upward against the force of gravity by the air flow from the blower. This allows the insulation granules to be fairly evenly dispersed as they pass the chemical spray nozzle 100.

As is commonly known, the spraying or dispensing of liquids into a cellulose material causes the material to take on a sticky or adhesive characteristic which tends to make the graules collect together or adhere to the pipe or conduit. One of the major problems with prior art devices is that these clumps of material adhere to the inside of the discharge pipe causing clogging which blocks the flow of material. The present invention readily solves this problem by providing a flexible pipe section 102 positioned immediately downstream of the spray nozzle 100. The flexible pipe section 102 has a corrugated bellows section 104 positioned within a cylindrical housing 106. The length of the corrugated bellows section 104 can be eight feet or longer in the relaxed condition and joins the rigid sections of the outlet discharge pipe 44. If desired, the flexible pipe section 102 can extend upwardly and beyond the elbow as seen in FIG. 1, or all the way to separator 46 so as to replace the rigid pipe 44 above the nozzle 100. A collar 108 is positioned around the bellows section 104 at its approximate midpoint. Outwardly extending arms 110 are positioned in opposite directions from the collar 108 and are guided in slots 112 provided in the housing 106. Pneumatic drive cylinders 114 and 116 are mounted on extensions 118. The extensions 118 are suitably attached to each side of the pipe as by welding and provide a rigid support for the functioning of the pneumatic cylinders 114, 116. The upper ends of the cylinders 114 and 116 are pivotally connected to the arms 110 and collar 108.

As shown in FIGS. 2 and 3, when the pneumatic cylinders 114, 116 are retracted, the collar 108 is caused to move downwardly compressing the lower half 122 of the bellows 104 and stretching the upper half 120. Periodically, as the need arises, the pneumatic cylinders 114, 116 are energized to extend the piston rods and thus raise the collar 108. This action reverses the condition causing the upper half 120 of the bellows 104 to be contracted while at the same time stretching the lower half 122. This cycling of the flexible pipe section 102 changes the internal surface configuration of the pipe to prevent the collection of the dampened insulation material on the inside surface or cause the material which has collected to be broken loose and carried away in the flow stream.

Although the timing of the cyclic operation of the pneumatic cylinders is governed by the characteristics of the material, it has been found that actuating the cylinders approximately every two or three minutes with a complete cycle in the range of four to six minutes has proven satisfactory. It is also to be understood that any type of longitudinal moving device, such as a single power cylinder and a cable which will cycle the flexible pipe section, can be substituted for the pneumatic cylinders described herein. Any device which will provide the longitudinal stretching and compressing movement to the pipe section is satisfactory.

As shown in FIG. 3, it is also possible to fabricate the flexible pipe section 102 by using two separate bellows sections which are of approximately equal length. As shown in FIG. 3, the bellows or flexible sections could be joined together at their adjacent ends by a coupling ring which would be equivalent to or take the place of the collar 108. In this arrangement, it would be possible to replace either the upper section 120 or the lower section 122 if a crack or fracture of any of the bellows portions of these sections might occur. It is also to be understood that any of the bellows sections can be formed from corrugated pipe section having sharp, squared, or curved inside surface configurations. It may be possible that the bellows section can be fabricated from any flexible material such as metal, canvas, or possibly some plastics.

The insulation bagging apparatus 56 is principally shown in FIGS. 5 and 6 with the control actuating mechanism shown in FIG. 4. The bagging apparatus 56 is mounted below and in front of the storage hopper 52 which receives and collects the finished fire retardant insulation material as it descends from the outlet 50 in the bottom of the second separator 46. The hopper 56 has a horizontally positioned loading chute 130 in which the auger conveyor 54 is located for dispensing the insulation directly into the bags. In reality, there are actually two or more separate chutes and bagging apparatus for simultaneously loading several bags at the same time. For the sake of simplicity, however, only one of the bagging apparatus will be described in its entirety.

As best seen in FIG. 6, a pair of support brackets 132, 134 are mounted on each side of the hopper 56 in a vertical position. A pair of rotatably mounted grooved wheels are mounted along the inside surfaces of the brackets 132, 134, respectively. If desired, a cross-member 140 can be provided between the brackets, 132, 134, for rigidity. A pair of guide rails 142, 144, are mounted under each side of the hopper 56 by means of the rear support plate 146 and the side brackets 148, 150. Each of the guide rails 142, 144, have a lower support rail member 152 and upper rail guide member 154.

A horizontally mounted movable bag carriage 156 has a pair of side members 158, 160, which are suitably cross-braced by cross members 162. The side rails 158, 160, are parallel and spaced to coincide with the spacing of the guide rails 142, 144. One end of the side rails 158, 160, have grooved wheels 164, 166, rotatably mounted thereon. The wheels 164, 166, are arranged to roll between the members of the respective guide rails 142, 144, with the side rails 158, 160, having a bottom edge "V" cross-section are supported on the rotatable guide wheels 136, 138, so that the bagging carriage 156 will easily move from a first retracted position to an extended or filled position during the loading operation. An end or bag holding portion 170 of the bag carriage 156 is pivotally mounted and includes side members 172, 174, and end member 176. Upwardly extending tines 178 are provided at the end of the carriage for supporting a bag when it is lowered or pivoted downward upon filling. Side angle members 180, 182, prevent the bag from rolling sideways off the edge of the carriage during the loading and unloading operation.

A hydraulic power cylinder 184 for moving the carriage 156 horizontally is attached to the cross-member 162 with the end of the piston attached to the end member 146. A pneumatic power cylinder, 186, is attached at one end to the bracket 188 and at the other end to the bracket 190 provided at the end of the carriage for pivoting the bag holding portion 170.

In FIG. 4 is shown the actuation system for operating the bagging apparatus described above. In this figure, the apparatus is in the unload condition with the bag holder in the down or vertical position. This is the end of the normal cycle and allows the filled bag to be easily removed from the machine.

The operating system provided in this bagging apparatus is a combination hydraulic and pneumatic system. The operator pulls an empty bag over the fill chute 130. The air compressor 200 is started and the operator energizes the start button which actuates air valve 204. Air is directed from compressor 200 to one side of the pneumatic cylinder 186. The introduction of air to the cylinder 186 extends the piston which raises the bag holder 170 into the horizontal position shown in dotted lines. At the same time that pneumatic valve 204 is energized, pneumatic valve 202 is also energized. This places pressurized air on the air side of the oil-air accumulator 206. The hydraulic side of the accumulator 206 is connected to a closed circuit which merely recirculates hydraulic oil back and forth between the hydraulic cylinder 184 and accumulator 206. Discharge pressure from the compressor 200 pressurizes the accumulator 206 which forces the hydraulic oil to enter the cylinder 184 which causes the piston to retract pulling the bag carriage 156 into the retracted start position with the tines 178 of the bag loader 170 adjacent the end of the insulation discharge chute 130. When the carriage reaches the start-fill position, it trips limit switch 210. The limit switch 210 at this point deenergizes valve 202 releasing accumulated air pressure in the accumulator 206. It also starts the power drive loader which rotates the auger conveyor 54 which causes the insulation material to be discharged through the chute 130 into the bag positioned thereover. As the insulation is packed into the bag, the carriage is forced to the left as seen in FIG. 4, with the resistance to this movement provided by the movement of the hydraulic oil from the cylinder 184 through the adjustable relief valve 212. As the hydraulic oil passes through the valve 212, it is returned directly to the oil side of the accumulator 206. It is also possible to by-pass this flow restriction by energizing flow valve 208. Once the carriage reaches limit switch 214, the packing conveyor 54 is stopped and the pneumatic valve 204 is automatically energized to release the pneumatic pressure in the cylinder 186. Upon release of the pneumatic pressure, the bag holder 170 is allowed to pivot to the vertical unload position. Thus, a complete cycle of the bag loading mechanism is accomplished. The positioning of another bag over the chute 130 allows the operation cycle to be started anew. Timers can be provided as part of the limit switch 214 to adjust the loading time for the bags to provide the proper weight of insulation to be packed in the bag during the filling process.

As stated above, one of the most important features of this process for producing a quality cellulose insulation product is the addition of the fire retardant chemicals. A rotary flow meter 72 is provided in the present system for sensing and transmitting a signal indicative of the rate of flow of dry chemicals to the secondary grinder.

The dry chemical storage container 62 with the discharge conveyor 66 provided at the bottom is connected to a chute 70 which delivers the dry fire retardant chemicals directly into the grinder 14. A chamber 240 is provided at the end of the housing for the conveyor 66 and receives the dry chemicals as they exit from the rotor. A baffle 242 is provided in the bottom of the chamber 240 to control the flow. An opening 244 is provided in the baffle 242 to direct the chemicals along the right side of the rotometer 72. The size of the opening 244 can be variable or adjustable as required to aid in the control of the delivery of the chemicals to the grinder. The discharge chute 70 has an upper end 246 and an outlet end 248. The rotometer 72 has a cylindrical sealed cage or drum 250 which is fixedly mounted upon a centrally positioned shaft 252 which is in turn rotatably mounted in sealed bearings 254 positioned on each side of the chute 70. A plurality of straight or curved vanes 256 are spacedly positioned around the circumference of the drum 250. The curvature of the vanes 256 can be arranged to better receive the flow of dry chemicals as shown by the arrows in FIG. 7 and turn the drum 250. A sealed microswitch 258 is mounted on the inside or outside of the chute 70 and includes an outwardly extending actuation arm 260. A plurality of pins are equally and radially spaced around one side of drum 250 in conjunction with the microswitch arm 260. As the drum is rotated by the flow of dry chemicals, along the right side as viewed in FIG. 7, the pins 262 intermittently contact and raise the lever 260 causing the microswitch 258 to be intermittently actuated. This turning on and off of the microswitch 258 causes a pulsed or cycling output signal to be sent to the control circuit associated therewith. The number and spacing of the pulses caused by the switch 258 during the rotation of the rotometer indicates the speed of rotation of the drum 250 and thus the quantity of dry chemicals flowing through the chute. Thus, the flow rate of the dry chemicals to the secondary fine grinder can be verified or determined.

In order to be able to visually observe the flow of chemicals through the flow meter chute 70, a glass window 264 is provided in the side adjacent to the drum 250 so that the flow of chemicals can be observed. In this way, the rate of a chemical flow can be visually determined, if desired.

The present cellulose insulation manufacturing system incorporates an electric warning system for maintaining control over the operation of the system itself. Both the output signal from the rotometer 72 and the liquid flow meter 96 are connected to this control system so that shutdown of the entire system can be obtained if the proper flow of either liquid or dry chemicals is not provided during the actual grinding of the cellulose insulation material.

The present warning system includes an electronic sensor and a focused light source attached to the liquid flow rate meter to detect a drop in the opaque float in the glass column. Thus, if the flow rate of the liquid fire retardant chemical drops below a set designated point, an output signal is produced indicating the drop in the flow rate of this chemical. It is also possible that a digital flow meter may be substituted for the photoelectric detector. The digital flow meter can have its output signal electrically connected to a counter to monitor and indicate any drop in the flow rate. If an indication of reduced flow rate is sensed, an alarm signal is generated which causes a bell to ring, indicator lights to be initiated, and the auger feed conveyor in the insulation holding bin which feeds the coarsely ground paper into the second stage, fine grinder to be stopped.

Figure 9:
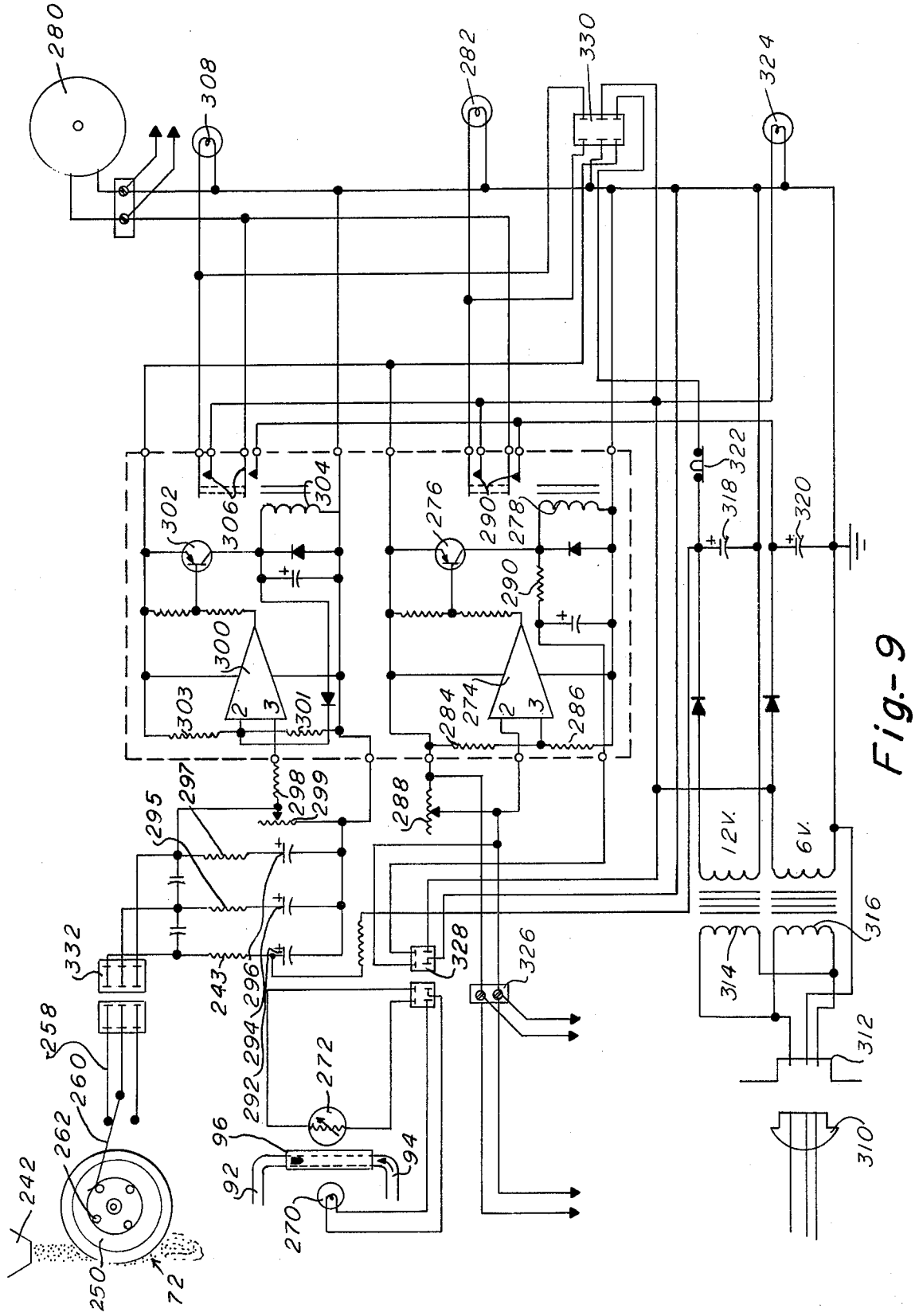
FIG. 9 is an electrical schematic showing the flow meter sensors and the control circuit for sensing chemical flow rate and providing automatic shutdown of the cellulose insulation system.

At the same time, the rate of discharge of the dry chemical into the second grinder is also monitored by the mechanical, water-wheel type rotometer, described above. This rotating cylinder is connected by the microswitch 258 to the electrical control circuit so as to indicate a slowing or stopping of the rotation. The chemicals dropping out of the discharge end of the chemical auger drop on this rotometer in such a way as to maintain its rotation at a speed indicating chemical fire retardant flow. If this discharge slows sufficiently or stops completely, then the alarm signal is again set off, stopping the insulation feed and initiating the alarm lights. The alarm control circuit shown in FIG. 9 is representative of a circuit which will perform this desired control alarm function.

Two separate circuits are actually provided in this operational system. The liquid flow meter 96, with its light source 270 and light detecting resistor 272, is electrically connected through operational amplifier 274, control transistor 276, and alarm relay 278, to the alarm bell 280 and indicator light 282. The operational amplifier (DIL) 274 has two inputs designated 2 and 3 on the schematic. An operational, logic amplifier, type number 741, is satisfactory for this purpose. A reference voltage is applied to input 3 through the voltage divider circuit provided by resistors 284 and 286. A similar sensor voltage divider circuit is provided by the upper leg variable resistor 288 and the lower leg formed by the relay coil 278, resistor 290, and Light Detecting Resistor (LDR) 272 positioned in conjunction with the flow meter 96. The LDR 272 changes resistance according to the amount of light striking the device.

Under dark conditions, the resistance of the LDR may be as high as 500 K-ohms and under bright light the resistance may drop to possibly 100 ohms. Thus, as long as light is striking the LDR, the voltage at input 2 of the operational amplifier is less than the reference voltage applied at input 3 and the operational amplifier will remain open. Any time that the liquid fire retardant chemical flow rate drops lower than a certain point where the flow meter float passes between the light source 270 and LDR 272, the resistance will greatly increase, causing the voltage to rise at pin 2 of the operational amplifier. When the voltage at pin 2 exceeds the reference voltage at pin 3, the operational amplifier 274 closes switching on the transistor 276. As transistor 276 is switched on, 12 volts is placed across the coil 278 of the relay energizing the contacts 290 which initiates the alarm bell 280 and indicator light 282 that the flow rate has decreased past the set point. If desired, this relay can also deenergize or stop the insulation feed conveyor discharging material to the second stage, fine grinder.

The microswitch 258 in the dry chemical flow is a single-throw, double pole switch which switches back and forth each time that a pin 262 mounted on the side of the drum 250 actuates the lever 260. The microswitch 258 output signal is connected to the control system through the voltage buffer resistors 293, 295, 297, and capacitors 292, 294, 296 in a stepped arrangement. As the switch is actuated producing the pulsed voltage output, a voltage is applied to capacitor 296, and in turn a comparable voltage is impressed upon pin 3 of operational amplifier 300 through variable resistor 299, and resistor 298. At the same time, a reference voltage is applied to pin 2 of the operational amplifier (DIL) 300 by voltage divider resistors 301 and 303.

As long as the drum of flow meter 72 is being rotated due to the proper flow of dry fire retardant chemicals, the pulsed signal will produce a higher voltage at pin 3 than the reference voltage at pin 2 causing the operational amplifier to remain open. If this pulsed signal should decrease or stop, the voltage applied across capacitor 296 will be drained off to ground through resistor 299 causing the voltage at pin 3 to decrease. Once this voltage drops below the reference voltage, the operational amplifier will "close" causing transistor 302 to switch "on", placing 12 volts across the coil 304 of the relay. Thus, the relay contacts 306 are closed and the alarm bell 280 and light 308 are energized, signaling a low dry chemical flow. Again, this relay can also stop the flow of cellulose material to the second stage grinder.

In both of the alarm systems described above, a latching circuit is provided for reinforcing the closed condition of the operational amplifiers once the respective relay has been energized. In this way, the alarm system will be maintained until the 12-volt circuit is deenergized by opening the reset switch 322. Once the 12-volt control circuit is broken, the alarm is stopped and the electronic circuit is neutralized until the normal operation of the system is restored.

To make the control alarm system operational, 110 volts AC is applied through plug 310 to receptacle 312 to the primaries of a 12-volt transformer 314 and a 6-volt transformer 316. The outputs from the transformers are rectified and filtered with the 6-volt DC output being utilized for energizing the alarm devices with the 12-volt DC output being used for operation of the control electronics.

Throughout this specification, reference has been made to the manufacture of cellulose insulation from waste paper and other cellulose products. Thus, the proper grinding and handling of the material is, although important, actually secondary to the controlled addition of the wet and dry fire retardant chemicals which must be added in proper proportions. It has been found through experimentation that a wet chemical solution consisting of (by weight) 2.0 pounds (0.9 kilograms) aluminum sulfate (ground), 0.25 pounds (112 grams) boric acid (granular), and 0.75 gallons (2.85 liters) water is suitable for a 30-pound (13.5 kilogram) bag of insulation. Also, it has been found that a dry chemical of 5.5 pounds (2.47 kilograms) of 5 mole borax (granular) is required for a 30-pound (13.5 kilogram) bag of insulation to produce the necessary fire retardant characteristics.

An improved method and apparatus for manufacturing a fire retardant cellulose insulation material has been shown and described in detail. It is obvious that this invention is not to be considered to be limited to the exact form disclosed and that changes in detail and construction may be made in the invention without departing from the spirit thereof.

What is claimed is:

1. An apparatus for making cellulose fire retardant insulation which comprises:
    (a) first grinding means for grinding waste paper and other cellulose material into a coarse granular state;
    (b) a second grinding means for grinding the coarse ground material into a fine granular state;

(c) first conduit means for transporting the coarsely ground material from said first grinding means to said second grinding means;
(d) means for introducing a continuous quantity of dry, fire retardant chemicals to said second grinding means so that said meterial and chemicals will be thoroughly ground and mixed;
(e) a second substantially vertical conduit means for transporting said fine granular material and dry chemicals to a storage means for storing the material prior to use, said second conduit means having a spray nozzle substantially centrally positioned in a portion thereof to spray a liquid fire retardant chemical in a pattern which is substantially perpendicular to the flow of said granular material to evenly dampen and wet the granular materials with the chemicals to produce a desirable fire retardant cellulose insulation material.

2. An apparatus for making a cellulose insulation as defined in claim 1 wherein said second conduit means includes a corrugated flexible pipe positioned immediately downstream of said spray nozzle so that the dampened granular material will not readily adhere to the inside surfaces of said pipe to prevent clogging.

3. An apparatus for making cellulose insulation as defined in claim 2 wherein a collar means is connected to said flexible pipe near its midpoint, a moving means is attached to said collar means and arranged to longitudinally move said flexible pipe in a periodic, cyclic motion whereby as one half of the flexible pipe is stretched, the opposite half is contracted to change the inside configuration of the pipe to aid in preventing the dampened insulation material from adhering to the inside surface of the second conduit means.

4. An apparatus for making cellulose insulation as defined in claim 3 wherein said moving means includes at least one pneumatic power cylinder and suitably connected to said flexible pipe and connected to a selective power source for extending or contracting said cylinder as required.

5. An apparatus for making cellulose insulation as defined in claim 2 wherein said flexible pipe is made from two separate flexible sections which are connected together at one end by the collar means so that either section can be easily removed and replaced as necessary.

6. An apparatus for making cellulose insulation as defined in claim 1 wherein said dry chemical introducing means includes a sensing means for indicating the flow rate of said dry chemicals being fed to said second grinding means.

7. An apparatus for making cellulose insulation as defined in claim 1 which further includes storage means for receiving the insulation material from said second conduit means, said storage means includes a means for loading a container with said cellulose insulation material, said loading means having a horizontal movable carriage means upon which the container may be moved as it is filled with said insulation material, said loading means further including means for lowering the filled container to a vertical position whereby it can be easily handled and removed.

* * * * *